US012799900B2

(12) United States Patent
Benattia et al.

(10) Patent No.: US 12,799,900 B2
(45) Date of Patent: Nov. 17, 2026

(54) IDLE SPEED MAINTENANCE CONTROL METHOD AND DEVICE

(71) Applicant: SAFRAN AIRCRAFT ENGINES, Paris (FR)

(72) Inventors: Seif Eddine Benattia, Moissy-Cramayel (FR); Cedrik Djelassi, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 17 days.

(21) Appl. No.: 19/131,787

(22) PCT Filed: Nov. 21, 2023

(86) PCT No.: PCT/FR2023/051834
§ 371 (c)(1),
(2) Date: May 21, 2025

(87) PCT Pub. No.: WO2024/110729
PCT Pub. Date: May 30, 2024

(65) Prior Publication Data

US 2026/0194022 A1 Jul. 9, 2026

(30) Foreign Application Priority Data

Nov. 24, 2022 (FR) ...................................... 2212286

(51) Int. Cl.
*F02C 9/48* (2006.01)

(52) U.S. Cl.
CPC .......... *F02C 9/48* (2013.01); *F05D 2220/323* (2013.01); *F05D 2270/022* (2013.01); *F05D 2270/052* (2013.01); *F05D 2270/304* (2013.01)

(58) Field of Classification Search
CPC ...... F02C 9/48; F02C 9/26; F02C 9/00; F02C 7/268; F05D 2270/022; F05D 2270/052;
(Continued)

(56) References Cited

U.S. PATENT DOCUMENTS

2004/0139727 A1* 7/2004 Horswill .................. F02C 9/28 60/233
2014/0283527 A1* 9/2014 Ling ......................... F02C 9/28 60/793

(Continued)

FOREIGN PATENT DOCUMENTS

EP 2626538 A1 8/2013
FR 2914697 A1 10/2008
FR 3027061 B1 4/2016

OTHER PUBLICATIONS

Search Report and Written Opinion issued in International Application No. PCT/FR2023/051834, mailed Feb. 26, 2024.

*Primary Examiner* — Thomas P Burke
(74) *Attorney, Agent, or Firm* — Bookoff McAndrews, PLLC

(57) ABSTRACT

Controlling a turbomachine including: the detection of a speed of a drive shaft of the turbomachine below an idle speed; the detection of a saturation of the fuel setpoint; the selection of a combined torque and fuel regulation loop from among at least one single-variable engine regulation loop and, the determination, in a combined manner, of a value representative of a fuel setpoint and of a value representative of a torque setpoint such that the torque setpoint compensates for the saturation of the fuel setpoint to allow the maintenance of a steady-state speed of the turbomachine.

11 Claims, 3 Drawing Sheets

(58) Field of Classification Search
CPC ......... F05D 2270/304; F05D 2270/101; F05D 2220/76
See application file for complete search history.

(56) References Cited

U.S. PATENT DOCUMENTS

| | | | | |
|---|---|---|---|---|
| 2021/0348569 | A1* | 11/2021 | Djelassi | B64D 27/33 |
| 2025/0163823 | A1* | 5/2025 | Terwilliger | B64D 27/33 |

* cited by examiner

[Fig. 1]
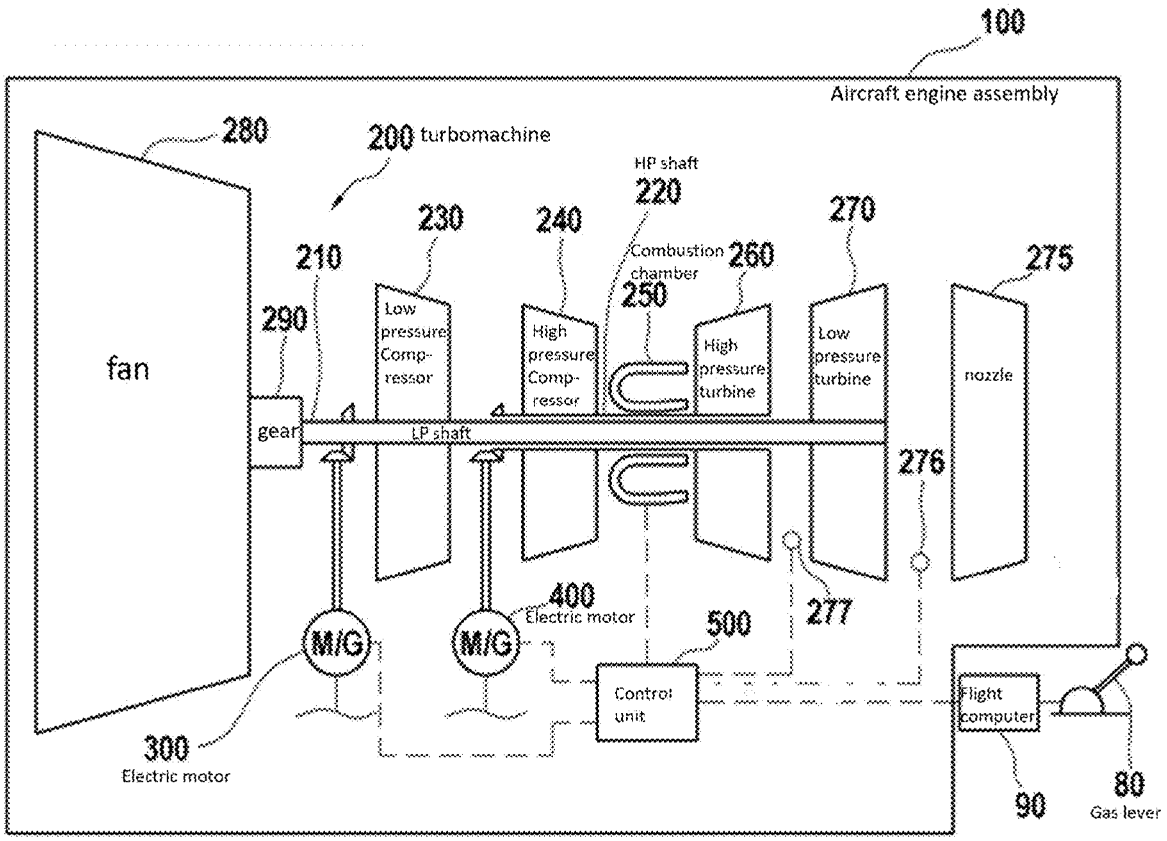

[Fig. 2]
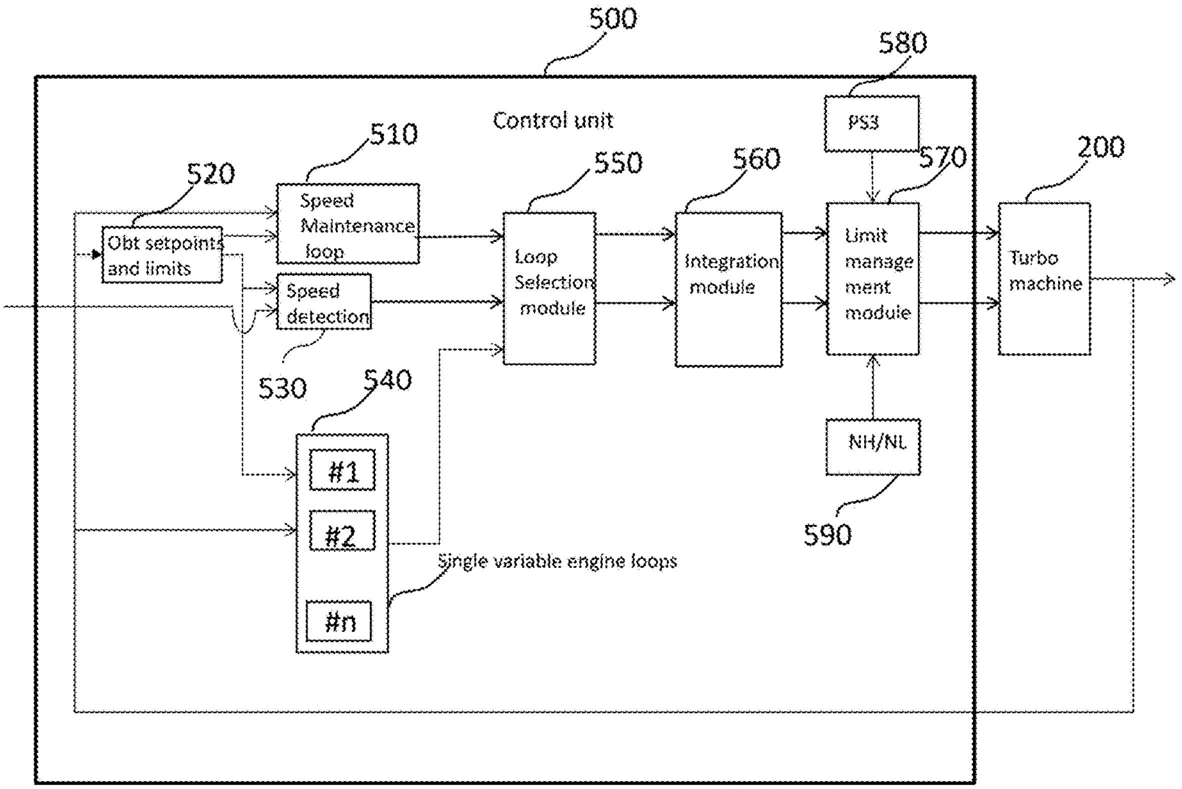

[Fig. 3]
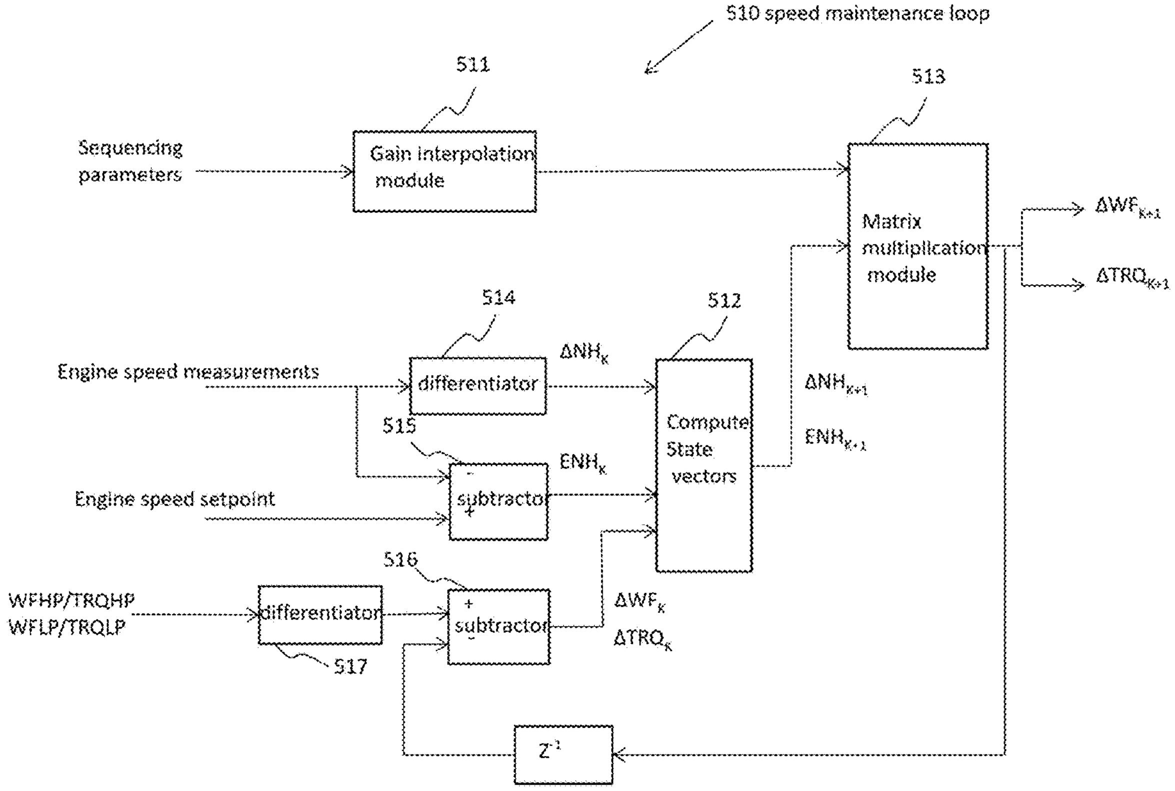

IDLE SPEED MAINTENANCE CONTROL METHOD AND DEVICE

CROSS-REFERENCE TO RELATED APPLICATIONS

This is a National Stage Application under 35 U.S.C. § 371 of International Application No. PCT/FR2023/051834, filed Nov. 21, 2023, now published as WO 2024/110729 A1, which claims priority to French Patent Application No. 2212286, filed on Nov. 24, 2022, the entireties of which are incorporated herein by reference.

TECHNICAL FIELD

The invention relates to the field of engines of the type affected by lock and rollback, and more particularly to the control of such an engine for maintaining its idle speed.

PRIOR ART

Ensuring the proper operation of the engine, particularly when the engine is equipping an aircraft, is a constant concern for manufacturers. Several parameters related to the engine environment are taken into account during the design and controlled during operation in such a way as to apply the correct setpoints to the engine to ensure correct operation in all the phases, and particularly in all the flight phases when the engine is installed onboard an aircraft.

Moreover, the design of a turbomachine requires the taking into account of a sufficient margin to guard against the so-called surge phenomenon. This phenomenon, which is the result of an excessive angle of attack of the air stream on the blades of one of the compressors, results in significant and rapid fluctuations in pressure downstream of the compressor in question and can lead to flameout of the combustion chamber. It also gives rise to considerable impact loads on the compressor blades and can thus lead to mechanical damage. It is therefore particularly advisable to avoid its appearance.

Among the parameters to be taken into account when designing a turbomachine, the correction of the fuel limit as a function of the air bleed, when this bleed is underestimated, can lead to an insufficient surge margin of the high-pressure compressor of the engine, resulting in a fuel setpoint below the steady-state operating line causing rollback of the engine. Solutions exist to palliate this drawback, particularly by adding a discharge valve. This discharge valve is controlled to open below a speed threshold of the high-pressure compressor and thus makes it possible to regain the surge margin at the high-pressure compressor. However, such a solution based on a surge valve, has the drawback of having to dimension the surge valve to take into account changes of requirement and therefore gives rise to a cost in terms of mass and bulk. Besides the maintenance of the high-pressure speed to avoid a rollback, there is also a need for maintenance of the low-pressure speed in an aircraft.

SUMMARY OF THE INVENTION

The invention makes it possible to palliate at least one of the drawbacks of the prior art and for this purpose makes provision for a method for controlling a turbomachine comprising:

- the detection of a speed of a drive shaft of the turbomachine below an idle speed;

- the detection of a saturation of the fuel setpoint;
- the selection of a combined torque and fuel regulation loop from among at least one single-variable engine regulation loop and,
- the determination, in a combined manner, of a value representative of a fuel setpoint and of a value representative of a torque setpoint such that said torque setpoint compensates for the saturation of said fuel setpoint to allow the maintenance of a steady-state speed of said turbomachine.

According to certain embodiments, said turbomachine having a high-pressure spool, said speed is the speed of said high-pressure spool and said determined torque setpoint allows the maintenance of the steady-state idle speed of said turbomachine to avoid a rollback of said engine.

According to certain embodiments, said turbomachine having a low-pressure spool, said speed is the speed of said low-pressure spool and said determined torque setpoint allows the maintenance of the steady-state idle speed of said engine.

According to certain embodiments, the determination of values representative of a fuel setpoint and of a torque setpoint comprises, in said combined regulation loop, the computation of a fuel increment and of a torque setpoint increment with respect to a preceding time.

According to certain embodiments, the combined torque and fuel setpoints for a current time are determined based on

- sequencing parameters,
- a value representative of the speed of the drive shaft at the current time and at the preceding time,
- an idle setpoint value,
- torque and fuel setpoint values computed at a preceding time.

According to certain embodiments, the method comprises in said combined regulation loop

- the determination of a variation (ΔNH, ΔNL) of the speed of the drive shaft between the current time and the preceding time,
- the determination of a difference (ENH, ENL) between said idle setpoint value and the value representative of the speed of the drive shaft at the current time,
- the determination of a difference ($\Delta WF_k$, $\Delta TRQ_k$) between the fuel and torque increment at the output of said regulation loop and an increment computed based on the difference between two determined preceding setpoint values,
- the determination of a state vector representative of the speed of the drive shaft at the following time ($\Delta NL_{k+1}$, $\Delta NH_{k+1}$) and of a difference between said idle setpoint value and the speed of the drive shaft at the following time ($ENL_{k+1}$, $ENH_{k+1}$) according to:

$$\begin{bmatrix} \Delta NL_{k+1} \\ ENL_{k+1} \end{bmatrix} = \begin{bmatrix} A & 0 \\ -I & I \end{bmatrix} \begin{bmatrix} \Delta NL_k \\ ENL_k \end{bmatrix} + \begin{bmatrix} B \\ 0 \end{bmatrix} \begin{bmatrix} \Delta WFLP_k \\ \Delta TRQLP_k \end{bmatrix} + \begin{bmatrix} 0 \\ I \end{bmatrix} \Delta NLC_k \quad \text{[MATH. 1]}$$

for the low-pressure drive shaft or $$\begin{bmatrix} \Delta NL_{k+1} \\ ENH_{k+1} \end{bmatrix} = \begin{bmatrix} A & 0 \\ -I & I \end{bmatrix} \begin{bmatrix} \Delta NL_k \\ ENH_k \end{bmatrix} + \begin{bmatrix} B \\ 0 \end{bmatrix} \begin{bmatrix} \Delta WFLP_k \\ \Delta TRQHP_k \end{bmatrix} + \begin{bmatrix} 0 \\ I \end{bmatrix} \Delta NHC_k \quad \text{[MATH. 2]}$$

for the high-pressure drive shaft

A, B and I being determined constants, $\Delta NLC_k$ being the difference between the low-pressure speed setpoint at the time k and at the time k−1, $\Delta NHC_k$ being the difference between the high-pressure speed setpoint at the time k and at the time k−1, the determination of a gain matrix K, the obtainment of the fuel increment and of the torque setpoint increment with respect to a preceding time being obtained according to the following formula:

$$\begin{bmatrix} \Delta WFLP_k \\ \Delta TRQHP_k \end{bmatrix} = -K \begin{bmatrix} \Delta NL_k \\ ENH_k \end{bmatrix} \quad \text{[MATH. 3]}$$

for the high-pressure drive shaft and $$\begin{bmatrix} \Delta WFLP_k \\ \Delta TRQLP_k \end{bmatrix} = -K \begin{bmatrix} \Delta NL_k \\ ENL_k \end{bmatrix} \quad \text{[MATH. 4]}$$

for the low-pressure drive shaft.

According to certain embodiments, the method comprises an integration of the torque and fuel increment obtained at the output of the regulation loop according to the following formulae:

$$WF_k = \Delta WF_k + WF_{k-1} \quad \text{[MATH. 5]}$$

and $$TRQ_k = \Delta TRQ_k + TRQ_{k-1} \quad \text{[MATH. 6]}$$

This invention also relates to a computer program including instructions for implementing a control method according to this invention when said computer program is executed by a computer.

This invention also relates to a recording medium readable by a computer on which a computer program according to this invention is recorded.

This invention also relates to a control device, in a turbomachine, comprising one or more processors configured to detect a speed of a drive shaft of the turbomachine below an idle speed and detect a saturation of the fuel setpoint, and following said detections, select a combined fuel and torque regulation loop from among at least one single-variable engine regulation loop determine, in a combined manner, a value representative of a fuel setpoint and a value representative of a torque setpoint such that said torque setpoint compensates for the saturation of said fuel setpoint to allow the maintenance of a steady-state speed of said turbomachine.

BRIEF DESCRIPTION OF THE DRAWINGS

FIG. 1 is a schematic representation of a turbomachine according to embodiments of this invention.

FIG. 2 is a schematic representation of a control device according to embodiments of this invention.

FIG. 3 is a schematic representation of an anti-rollback loop.

DESCRIPTION OF THE EMBODIMENTS

As illustrated on FIG. 1, an aircraft engine assembly 100 according to an embodiment may comprise a turbomachine 200, a first electric motor 300 and a second electric motor 400, and a control unit 500. The turbomachine 200 may comprise a low-pressure shaft 210 and a high-pressure shaft 220. The low-pressure shaft 210 and the high-pressure shaft 220 can be arranged coaxially, as illustrated. The turbomachine 200 may also comprise a low-pressure compressor 230, a high-pressure compressor 240, a combustion chamber 250, a high-pressure turbine 260, a low-pressure turbine 270, and an exhaust nozzle 275, successively arranged in the direction of flow in an annular work fluid path, in such a way that air taken in upstream of the low-pressure compressor 230 is successively compressed in the low-pressure compressor 230 and in the high-pressure compressor 240, to then generate hot combustion gases in the combustion chamber 250 by combustion of a fuel injected into this combustion chamber 250. These combustion gases can then be successively expanded in the high-pressure turbine 260 and in the low-pressure turbine 270, in such a way as to rotationally actuate them, before being expelled through the nozzle 275. The high-pressure shaft 220 can be mechanically coupled to the high-pressure turbine 260 and to the high-pressure compressor 240, in such a way that the high-pressure turbine 260 can rotationally drive the high-pressure shaft 220 and the high-pressure compressor 240, while the low-pressure shaft 210 can be mechanically coupled to the low-pressure turbine 270 and to the low-pressure compressor 230, in such a way that the low-pressure turbine 270 can then rotationally drive the low-pressure shaft 210 and the low-pressure compressor 230.

As in the illustrated embodiment, the turbomachine 200 can be a bypass turbojet engine also comprising a fan 280, which can also be mechanically coupled to the low-pressure shaft 230, in such a way that it is also able to be rotationally driven by the low-pressure turbine 270 through the low-pressure shaft 210. As illustrated, the turbomachine 200 could also comprise a reduction gear 290 inserted between the low-pressure shaft 210 and the fan 280, in such a way that the fan 280 can be driven with a lower rotation speed than the low-pressure shaft 210. However, a fan directly driven by the low-pressure shaft 210 may also be envisioned. Moreover, other architectures of the turbomachine 200, without any fan, may also be envisioned. Thus, the turbomachine 200 could alternatively be a turboprop engine, with at least one propeller mechanically coupled to the low-pressure shaft 210 via the reduction gear 290, or a turboshaft engine, with at least one lift rotor mechanically coupled to the low-pressure shaft 210 via the reduction gear 290. It may also be envisioned, in particular for a turboshaft engine or a turboprop engine, for the turbomachine 200 to comprise only a single compressor, mechanically coupled to the high-pressure shaft 210.

The first electric machine 300 can, as illustrated, be configured as a motor-generator to selectively convert electrical energy into mechanical work in motor mode and mechanical work into electrical energy in generator mode. This first electric machine 300 can be mechanically coupled to the low-pressure shaft 210 to actuate, in motor mode, the low-pressure shaft 210, and to be actuated, in generator mode, by the low-pressure shaft 210. However, it may also be envisioned, in the context of this invention, for it to only be configured as an electrical generator, able solely to convert mechanical work into electrical energy.

Similarly, the second electric machine 400 can also be, as illustrated, configured as a motor-generator to selectively convert electrical energy into mechanical work in motor mode and mechanical work into electrical energy in generator mode. This motor can be mechanically coupled to the high-pressure shaft 220 to actuate, in motor mode, the high-pressure shaft 220, and to be actuated, in generator mode, by the high-pressure shaft 220. However, it may also be envisioned, in the context of this invention, for it to only be configured as an electrical generator, able solely to convert mechanical work into electrical energy.

The control unit 500 can be an electronic control unit, optionally a Full Authority Digital Engine Control (or FADEC). It can in particular take the form of an electronic processor able to implement the instructions of a computer program for controlling the operation of the engine assembly 200. This control unit 500 obtains signals representing operating parameters of the turbomachine 200. This control unit 500 can be connected to the turbomachine 200 to control, in particular, the supply of fuel to the combustion chamber 250, supplying it with a fuel flow rate setpoint WF_CMD, and also to the motor 400 to supply it with a torque setpoint TRQ_CMD to command the injection and/or extraction of mechanical work from the high-pressure shaft 220. The control unit 500 can also be connected to a manual controller, such as for example a gas lever 80, and/or to a flight computer 90, in order to receive an operating setpoint of the engine assembly 200, which can for example take the form of a setpoint of thrust, power, or rotation speed of the low-pressure shaft 210 and/or of the high-pressure shaft 220.

The control unit 500 can moreover be connected to temperature sensors 276 and 277, disposed, respectively, directly downstream and upstream of the low-pressure turbine 270, to receive temperatures of the combustion gases at the outlet of the low-pressure turbine 270 and at the outlet of the high-pressure turbine 260, to one or more pressure sensors (not illustrated), disposed in the combustion chamber 250 to sense a static pressure at the inlet of the combustion chamber 250 and transmit it to the control unit 500, and to one or more flow rate sensors (not illustrated), disposed in a fuel supply circuit of the combustion chamber 250.

FIG. 2 is a schematic representation of a control device 500 according to embodiments of this invention. As explained previously, the device 500 may be included in a control device of FADEC type. The schematic view provided can be implemented in the form of software or hardware modules.

The control device 500 may comprise a module 520 in charge of obtaining the setpoints and limits specific to the turbomachine 200. In particular, it can be in charge of obtaining temperature, pressure and speed parameters of the engine all the time or at several times. These parameters are obtained, for example, by data from the sensors which may be present in the device 100 and more precisely in relation to the operation of the turbomachine 200.

These parameters are supplied to a module 530 which detects that the speed of the engine is too low, it can for example be detection of a rollback of the turbomachine 200. A rollback is detected when the engine speed NH of the high-pressure shaft is less than a determined threshold value, for example but without limitation 14950 rpm (revolutions per minute). The module 530 supplies an indicator signal to a loop selection module 550 to indicate that a state of rollback of the turbomachine has been detected. The detection of maintenance of a speed can be done for any other speed value that one wishes to maintain or below which it is not desirable for the engine to run and can also be applied to the low-pressure shaft.

The control device 500 also comprises a speed maintenance loop or regulation loop 510 which will be described in more detail with reference to FIG. 3. The speed maintenance loop 510 outputs a fuel setpoint as well as a torque setpoint, computed at one and the same time interval or simultaneously, or in a combined manner. It makes it possible to maintain an engine speed of the high-pressure shaft or maintain an engine speed of the low-pressure shaft. In certain embodiments, two maintenance loops may exist, one for the high-pressure shaft 220 and the other for the low-pressure shaft 210.

The control device 500 also comprises one or more single-variable engine loops 540 mono variables 540-1 to **540-*n*** which are in charge of delivering fuel commands, these setpoints being computed individually. These single-variable loops may comprise engine parameters such as:

- a temperature input T2,
- a turbomachine 200 speed NL input,
- a turbomachine 200 speed NH input,
- A setpoint speed NLCONS input defined by the position of the control stick handleable by the aircraft pilot,
- A setpoint speed NHCONS input defined by the position of the control stick handleable by the aircraft pilot,
- A fuel flow rate setpoint WF output transmitted to the turbomachine 200,
- A torque setpoint WTRQ output transmitted to the turbomachine 200,
- Flame-out protection setpoints: minimum speed HP and/or minimum speed BP,
- Low overspeed protection setpoints: maximum speed HP,
- Chamber burst protection: maximum pressure PS3,
- Maintenance of the desired level of air bleed: minimum pressure PS3.

At least two of these single-variable loops deliver a fuel setpoint for one and an engine torque setpoint for the other.

The loop selection module 550 selects one of the engine loops **540-*i*, i being a variable between 1 and n, of the module 540 or the speed maintenance loop 510**. The selection of the speed maintenance loop is done following the detection of a certain number of parameters:

- a deceleration indicator at a value of 0, i.e. no deceleration detected and,
- the non-detection of events such as flameout, surge, or rotating stall.

Other additional and optional parameters may individually or cumulatively participate in the selection of the speed maintenance loop. These include by way of example:

- the detection of a speed of the high-pressure spool of said engine below an idle speed and
- the detection of a speed of the low-pressure spool of said engine below an idle speed,
- the detection of a saturation of the fuel setpoint.

The detection of a saturation of the fuel setpoint is done measuring the setpoint between:

- The CsP limit (richness in the combustion chamber) which is a function of the speed P reduced by the inlet temperature of the HP compressor (T25) and by the total pressure at the inlet of said engine (PT2).
- The measured CsP which is computed based on the inlet pressure of the combustion chamber (PS3), the fuel and on the inlet temperature of the HP compressor (T25).

According to certain embodiments, the selection of the speed maintenance loop could include a hysteresis in such a way as to be robust to oscillations.

The fuel correction quantity (or increment) AWF resulting from the selected loop is supplied to an integration module 560. The integration module 560 determines the fuel flow rate setpoint WF by integration of the fuel correction quantity ΔWF. The torque setpoint quantity (or increment) ΔTRQ resulting from the selected loop is also supplied to the integration module 560. The integration module 560 determines the torque flow rate setpoint TRQ by integration of the torque correction quantity ΔTRQ. The quantities obtained at the output of the module 560 are thus obtained for a time k:

$$WF_k = \Delta WF_k + WF_{k-1} \quad \text{[MATH. 7]}$$

$$TRQ_k = \Delta TRQ_k + TRQ_{k-1} \quad \text{[MATH. 8]}$$

The fuel WF and torque TRQ setpoints at the output of the integration module 560 are transmitted to a limit management module 570.

The limit management module 570 limits the value of the fuel flow rate setpoint WF determined by the integration module 560. In a known manner, the limit management module 570 implements a limit, the so-called C/P limit, known to those skilled in the art and not described in more detail. Preferably, the limit management module 570 determines the limits as a function of the static pressure in the combustion chamber PS3 and of the speed NH (high-pressure spool speed) or of the speed NL (low pressure).

The limit management module 570 also limits the torque flow rate setpoint TRQHP value determined by the integration module 560. In a known manner the limit management module 570 implements a limit, the so-called C/P limit, known to those skilled in the art and not described in more detail. Preferably, the limit management module 570 determines the limits as a function of the static pressure in the combustion chamber PS3 and of the speed NH (high-pressure spool speed) or of the speed NL (low pressure).

The limit management module 570 therefore supplies as output the final fuel WF and torque TRQ setpoints to the turbomachine.

FIG. 3 shows a schematic view of the anti-rollback loop 510.

The anti-rollback loop 510 makes it possible to compute the correct dose of fuel and torque to be supplied to the turbomachine when a rollback of the turbomachine is detected. The two fuel and torque quantities affect one another and thus a multivariable anti-rollback loop makes it possible to deliver a torque and fuel setpoint making it possible to maintain the engine in idle, avoiding rollback.

The loop 510 is a multivariable loop in the sense that it allows a correction at the same time, or else simultaneously, or else in a combined manner, to determine a fuel setpoint and a torque setpoint making it possible to maintain an idle speed.

The loop 510 is of state feedback type with integration of the slaving error on the high-pressure speed NH or low-pressure speed NL (class 1 system) to simultaneously compute the fuel increment setpoint ΔWFHP and the torque setpoint ΔTRQHP which make it possible to maintain the speed of the high-pressure spool in idle or the fuel increment setpoint ΔWFLP and the torque setpoint ΔTRQLP which make it possible to maintain the speed of the low-pressure body in idle.

The loop 510 receives sequencing parameters as input. The sequencing parameters may comprise parameters relating to flight altitude, pressure (in the different parts of the engine), or engine temperature (in the different parts of the engine).

It also receives information relating to, or values representative of the high-pressure NH or low-pressure NL engine speed at the current time and an item of information about, or value of, the idle setpoint as well as the torque and fuel setpoints computed with the previous computation increment at the output of the module 500.

The loop 510 comprises a first differentiator 514 which computes the difference between the engine speed at the current time k+1 and at the preceding time k, ΔNH for the high-pressure shaft or ΔNL for the low-pressure shaft. The values representative of the preceding time may for example be recorded by the maintenance loop 510.

It also comprises a first subtractor 515 which computes a value ENH for the high-pressure shaft or a value ENL for the low-pressure shaft. This value corresponds to a difference between a setpoint of the engine speed and a measurement of the engine speed. In other words, each measurement has an associated setpoint, the measurement and the setpoint both coinciding in time. The regulation tries to bring each measurement closer to the setpoint. The setpoint, which can be an idle setpoint, makes it possible to guarantee the restrictions of:

- not exceeding the T5 overheat limit (temperature at the outlet of the low-pressure turbine),
- maintaining a sufficient surge margin,
- maintaining a sufficient combustion chamber flameout margin,
- minimum thrust to be supplied.

It also comprises a second differentiator 517 which computes the difference between the final setpoint for each of the quantities WFHP and TRQHP for the high-pressure shaft or WFLP and TRQLP for the low-pressure shaft at the output of the module 500 at the preceding time k and at the time preceding that, k−1.

It also comprises a second subtractor 516 which computes a difference between the value ΔWF at the output of the second differentiator 517 and the value ΔWF computed by the loop 510 at the preceding time as well as a difference between the value ΔTRQ at the output of the second differentiator 517 and the value ΔTRQ computed by the loop 510 at the preceding time. Note here that AWF corresponds either to the value ΔWFHP or to the value ΔWFLP according to whether the high-pressure or low-pressure speed is being maintained.

The loop 510 also comprises a module 512 for computing state vectors. The state vector computing module 512 receives as input the outputs of the modules 514, 515 and 516.

According to a first embodiment, the module 512 determines the value ΔNH for the high-pressure shaft, at the current time k, denoted $\Delta NH_k$ or respectively ΔNL for the low-pressure shaft, at the current time k, denoted $\Delta NL_k$.

$$\Delta NH_k = A \times \Delta NH_{k-1} + B \times \begin{bmatrix} \Delta WF_{k-1} \\ \Delta TRQ_{k-1} \end{bmatrix} \quad \text{[MATH. 9]}$$

This determination is based on a particular model of the turbomachine by a linear system also known as LTI for Linear Time-Invariant. This equation represents a synthesis model which makes it possible to connect the fuel setpoint/torque setpoint to the speed of the engine.

In this equation, "A" represents a time constant characteristic of the response time of the turbomachine and is therefore related thereto. The term "B" is a static gain establishing a relationship between a setpoint increment and a speed increment obtained by this setpoint increment once the speed has stabilized.

According to a second embodiment, to cancel out the dynamic error, also known as "lag", i.e. a delay between a linear variation of the setpoint and the corresponding variation of the engine speed, an augmented synthesis model can be used.

This augmented synthesis model determines the values ΔNH and ENH at the current time k written $\Delta NH_k$ and $ENH_k$ for the high-pressure shaft and ΔNL and ENL at the current time k, written $\Delta NL_k$ and $ENL_k$ for the low-pressure shaft.

The values written $\Delta NH_k$ and $ENH_k$ are obtained by the following equation:

$$\begin{bmatrix} \Delta NH_k \\ ENH_k \end{bmatrix} = \begin{bmatrix} A & 0 \\ -I & I \end{bmatrix}\begin{bmatrix} \Delta NH_{k-1} \\ ENH_{k-1} \end{bmatrix} + \begin{bmatrix} B \\ 0 \end{bmatrix}\begin{bmatrix} \Delta WFHP_{k-1} \\ \Delta TRQHP_{k-1} \end{bmatrix} + \begin{bmatrix} 0 \\ I \end{bmatrix}\Delta NHC_k \quad \text{[MATH. 10]}$$

The values written $\Delta NL_k$ and $ENL_k$ are obtained by the following equation:

$$\begin{bmatrix} \Delta NL_k \\ ENL_k \end{bmatrix} = \begin{bmatrix} A & 0 \\ -I & I \end{bmatrix}\begin{bmatrix} \Delta NL_{k-1} \\ ENL_{k-1} \end{bmatrix} + \begin{bmatrix} B \\ 0 \end{bmatrix}\begin{bmatrix} \Delta WFLP_{k-1} \\ \Delta TRQLP_{k-1} \end{bmatrix} + \begin{bmatrix} 0 \\ I \end{bmatrix}\Delta NLC_k \quad \text{[MATH. 11]}$$

In these equations, according to a particular embodiment, the constant "I" takes the value "1".

The loop 510 also comprises a gain interpolation module 511. The module 511 comprises a matrix K for each point of the operating envelope. These interpolation matrices comprise coefficients $k_{i,j}$ which represent the state of the turbomachine as a function of the sequencing parameters. Thus, as a function of the sequencing parameters representing the state of the turbomachine in the operating envelope, each coefficient ki,j is linearly interpolated.

The determination of the gain matrix K equates to performing "the synthesis of the multivariable electronic control unit". This synthesis is of linear quadratic (LQ) state feedback type and consists in minimizing a criterion 'J' or a quantity 'J' in which the weighting matrices Q, R and S appear. These latters are set at the start of computation according to the desired behavior of the engine, and in particular according to the desired absence of lag. More precisely, it is the choice of the weighting matrices Q, R and S that makes it possible to obtain different settings of the corrector and the desired engine behavior, for example the elimination of the lag, i.e. the minimization of the transfer between the setpoint and the slaving error within the meaning of the standard 2 by constraining the error dynamic.

For the high-pressure shaft:

$$= \sum_{k=0}^{\infty} Q \times \Delta NH_k^2 + [\Delta WFHP_k \;\; \Delta TRQHP_k] \times R \times \begin{bmatrix} \Delta WFHP_k \\ \Delta TRQHP_k \end{bmatrix} + 2\Delta NH_k \times S \times \begin{bmatrix} \Delta WFHP_k \\ \Delta TRQHP_k \end{bmatrix} \quad \text{[MATH. 12]}$$

For the low-pressure shaft:

$$J = \sum_{k=0}^{\infty} Q \times \Delta NL_k^2 + [\Delta WFLP_k \;\; \Delta TRQLP_k] \times R \times \begin{bmatrix} \Delta WFLP_k \\ \Delta TRQLP_k \end{bmatrix} + 2\Delta NL_k \times S \times \begin{bmatrix} \Delta WFLP_k \\ \Delta TRQLP_k \end{bmatrix} \quad \text{[MATH. 13]}$$

The minimization of the criterion J by the Lagrangian makes it possible to work with an analytic expression of the gain matrix K in the form:

$$K = (R + B^T PB)^{-1}(B^T PA + S) \quad \text{[MATH. 14]}$$

In this analytic expression, the matrices R, B, A and S are known, only the matrix P is determined according to the expression of the single solution of the discrete Riccati algebraic equation:

$$\tilde{A}^T P\tilde{A} - P - (\tilde{A}^T P + S)(\tilde{B}^T P\tilde{B} + R)^{-1}(\tilde{B}^T P\tilde{A} + S^T) + Q = 0 \quad \text{[MATH. 15]}$$

With:

$$\tilde{A} = \begin{bmatrix} A & 0 \\ -I & I \end{bmatrix} \quad \text{[MATH. 16]}$$

and $$\tilde{B} = \begin{bmatrix} B \\ 0 \end{bmatrix} \quad \text{[MATH. 17]}$$

This last equation makes it possible to determine P and consequently the gain matrix K.

Note that the gain matrix K in fact depends on the engine operating point. More precisely, the gain matrix K is determined based on the terms A and B which themselves depend on the engine operating point.

This is taken into account in practice by predetermining a set of reference matrices and, as a function of the measurement of the engine operating point, computing the gain matrix by interpolation between two reference matrices.

The set of reference matrices is previously determined before the implementation of the method. Each reference matrix is associated with an operating point of the turbomachine, the so-called reference point.

A reference matrix is associated with an equation of change of the vector for tracking an angular velocity command formed of a variation in angular velocity at a time, a difference in velocity at the command at the time and an integral of the difference The operating point can in particular be deduced from an internal measurement of the engine such as for example a measurement of the speed of the drive shaft or else a measurement of the pressure at the inlet of the combustion chamber, and on a measurement external to the engine such as for example the external pressure. The operating point can therefore be associated with a vector of several measurements.

The measured operating point (or rather the "operating point" vector) makes it possible to determine the gain matrix K to be used at this point by linear interpolation between reference matrices associated with reference vectors surrounding the "operating point" vector.

The anti-lock loop also comprises a matrix multiplication module 513 for determining fuel and electrical torque setpoint values at the current time.

Knowing the gain matrix K then makes it possible during the control method to simultaneously determine the variation in fuel flow rate ΔWF and the variation in electrical torque ΔTRQ as a function of ΔN and of the quantity EN using the following equation:

For the high-pressure shaft $$\begin{bmatrix} \Delta WFHP_k \\ \Delta TRQHP_k \end{bmatrix} = -K\begin{bmatrix} \Delta NH_k \\ ENH_k \end{bmatrix} \quad \text{[MATH. 18]}$$

And for the low-pressure shaft $$\begin{bmatrix} \Delta WFLP_k \\ \Delta TRQLP_k \end{bmatrix} = -K\begin{bmatrix} \Delta NL_k \\ ENL_k \end{bmatrix} \quad \text{[MATH. 19]}$$

The fuel setpoint ΔWF and the electrical torque setpoint ΔTRQ obtained by the module 513 are transmitted to the loop selection module 550. As mentioned previously, these torque and fuel setpoints can be adapted either to the high-pressure shaft 220, or to the low-pressure shaft 210, or both.

The invention claimed is:

1. A method for controlling a turbomachine comprising:

the detection of a speed of a drive shaft of the turbomachine below an idle speed;

the detection of a saturation of a fuel setpoint;

the selection of a combined torque and fuel regulation loop from among at least one single-variable engine regulation loop; and the determination, in a combined manner, of a value representative of the fuel setpoint and of a value representative of a torque setpoint such that said torque setpoint compensates for the saturation of said fuel setpoint to allow a maintenance of a steady-state speed of said turbomachine.

2. The method of claim 1, wherein said turbomachine having a high-pressure spool, said speed is the speed of said high-pressure spool and said determined torque setpoint allows the maintenance of the steady-state idle speed of said turbomachine to avoid a rollback of said turbomachine.

3. The method of claim 1, wherein said turbomachine having a low-pressure spool, said speed is the speed of said low-pressure spool and said determined torque setpoint allows the maintenance of the steady-state idle speed of said turbomachine.

4. The method of claim 1, wherein the determination of values representative of a fuel setpoint and of a torque setpoint comprises, in said combined torque and fuel regulation loop, the computation of a fuel increment and of a torque setpoint increment with respect to a preceding time.

5. The method of claim 4, wherein said combined torque and fuel setpoints for a current time are determined based on:

sequencing parameters, a value representative of the speed of the drive shaft at the current time and at a preceding time, an idle setpoint value, and torque and fuel setpoint values computed at a preceding time.

6. The method of claim 5, comprising in said combined torque and fuel regulation loop:

the determination of a variation of the speed of the drive shaft between the current time and the preceding time, the determination of a difference between said idle setpoint value and the value representative of the speed of the drive shaft at the current time, the determination of a difference between a fuel and torque increment at an output of said combined torque and fuel regulation loop and an increment computed based on the difference between two determined preceding setpoint values, the determination of a state vector representative of the speed of the drive shaft at a following time and of a difference between said idle setpoint value and the speed of the drive shaft at the following time according to:

$$\begin{bmatrix} \Delta NL_{k+1} \\ ENL_{k+1} \end{bmatrix} = \begin{bmatrix} A & 0 \\ -I & I \end{bmatrix}\begin{bmatrix} \Delta NL_k \\ ENL_k \end{bmatrix} + \begin{bmatrix} B \\ 0 \end{bmatrix}\begin{bmatrix} \Delta WFLP_k \\ \Delta TRQLP_k \end{bmatrix} + \begin{bmatrix} 0 \\ I \end{bmatrix}\Delta NLC_k$$

for a low-pressure drive shaft, or $$\begin{bmatrix} \Delta NH_{k+1} \\ ENH_{k+1} \end{bmatrix} = \begin{bmatrix} A & 0 \\ -I & I \end{bmatrix}\begin{bmatrix} \Delta NH_k \\ ENH_k \end{bmatrix} + \begin{bmatrix} B \\ 0 \end{bmatrix}\begin{bmatrix} \Delta WFHP_k \\ \Delta TRQHP_k \end{bmatrix} + \begin{bmatrix} 0 \\ I \end{bmatrix}\Delta NHC_k$$

for a high-pressure drive shaft,

A, B and I being determined constants, $\Delta NLC_k$ being the difference between a low-pressure speed torque setpoint at the time k and at the time k−1, $\Delta NHC_k$ being the difference between a high-pressure speed torque setpoint at the time k and at the time k−1, the determination of a gain matrix K, the obtainment of the fuel increment and of the torque setpoint increment with respect to a preceding time being obtained according to the following formula:

$$\begin{bmatrix} \Delta WFHP_k \\ \Delta TRQHP_k \end{bmatrix} = -K\begin{bmatrix} \Delta NH_k \\ ENH_k \end{bmatrix}$$

for the high-pressure drive shaft and $$\begin{bmatrix} \Delta WFLP_k \\ \Delta TRQLP_k \end{bmatrix} = -K\begin{bmatrix} \Delta NL_k \\ ENL_k \end{bmatrix}$$

for the low-pressure drive shaft.

7. The method of claim 6, comprising an integration of the torque and fuel increment obtained at the output of the combined torque and fuel regulation loop according to the following formula:

$$WF_k = \Delta WF_k + WF_{k-1} \text{ and } TRQ_k = \Delta TRQ_k + TRQ_{k-1}.$$

8. A computer program including instructions for implementing a control method as claimed in claim 1, when said computer program is executed by a computer.

9. A recording medium readable by a computer on which a computer program as claimed in claim 8 is recorded.

10. A control device, in a turbomachine, comprising one or more processors configured to:

detect a speed of a drive shaft of the turbomachine below an idle speed, detect a saturation of a fuel setpoint, select a combined fuel and torque regulation loop from among at least one single-variable engine regulation loop, and determine, in a combined manner, a value representative of the fuel setpoint and a value representative of a torque setpoint such that said torque setpoint compensates for the saturation of said fuel setpoint to allow a maintenance of a steady-state speed of said turbomachine.

11. An aircraft comprising a control device as claimed in claim 10.

* * * * *